UNITED STATES PATENT OFFICE.

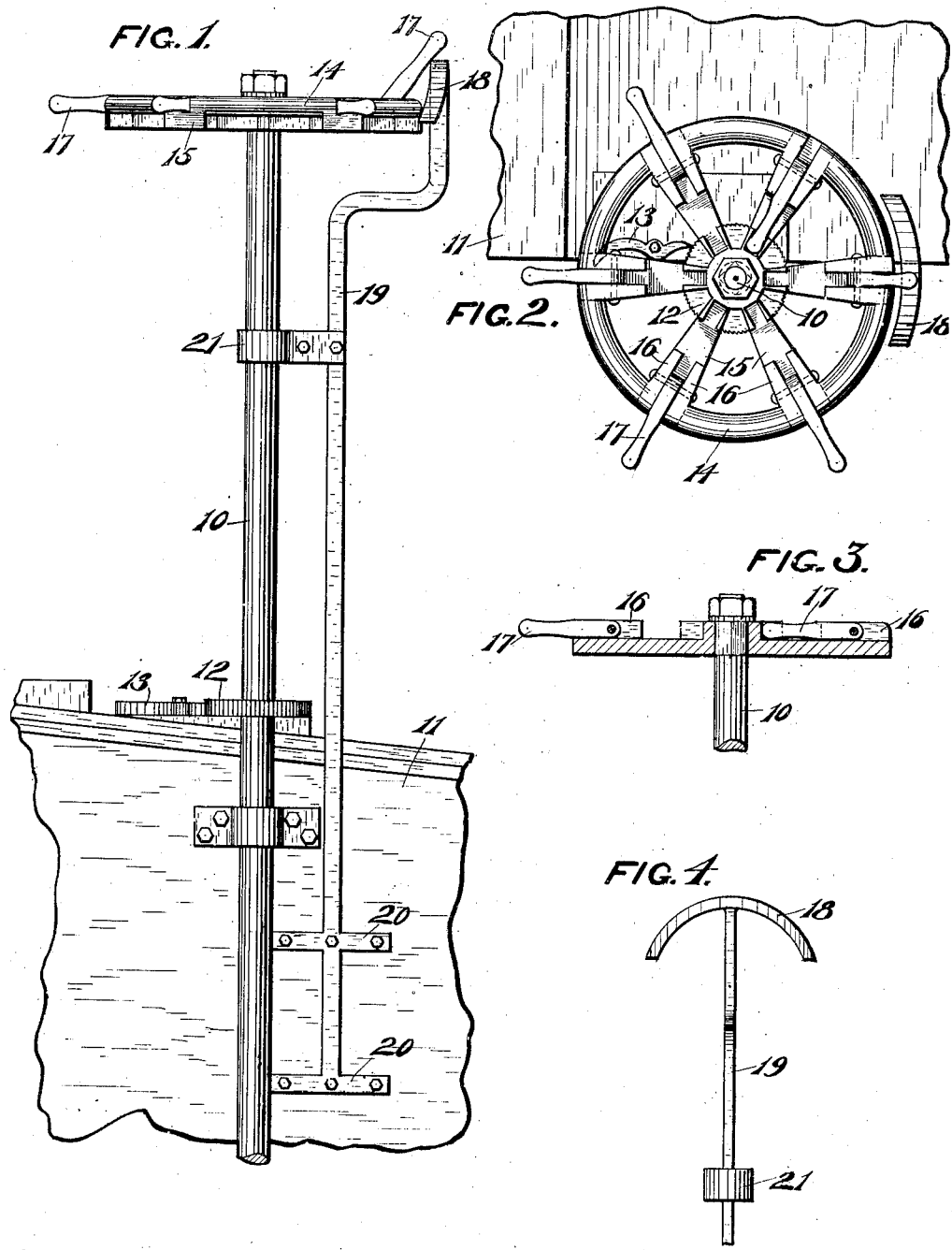

DANIEL JOSEPH MONTAMBO, OF PENTOGA, MICHIGAN.

BRAKE-WHEEL.

No. 901,634.    Specification of Letters Patent.    Patented Oct. 20, 1908.

Application filed May 29, 1908. Serial No. 435,641.

*To all whom it may concern:*

Be it known that I, DANIEL J. MONTAMBO, residing in Pentoga, in the county of Iron and State of Michigan, have invented new and useful Improvements in Brake-Wheels, of which the following is a description, reference being had to the accompanying drawings, which are a part of this specification.

This invention has for its object to provide a brake wheel with convenient handles by which it may be turned instead of requiring a brakeman to grasp the rim of the wheel as usual, such handles being pivotally mounted so as to be capable of swinging beyond the rim of the wheel and provided with a guard to return them to their inward positions when the brake is released to prevent their injuring the brakeman.

With the above and other objects in view the invention consists in the brake wheel herein claimed, its parts and combinations of parts and all equivalents.

Referring to the accompanying drawings in which like characters of reference indicate the same parts in the several views; Figure 1 is an elevation of a brake wheel constructed in accordance with this invention mounted on the end of a box car; Fig. 2 is a plan view thereof; Fig. 3 is a central sectional view thereof; and, Fig. 4 is a detail view of the guard for returning the handles to their inward position.

In these drawings 10 represents a brake shaft mounted on the end of a box car 11 as usual with an ordinary ratchet 12 and its engaging dog 13 for locking it when it is holding the brakes. The brake wheel 14, which is mounted on the end of the shaft in the ordinary manner, has each of its spokes 15, preferably six in number, recessed or grooved to form parallel flanges 16 between which handle members 17 are pivoted so as to extend beyond the rim of the wheel or to lie within the housing therefor formed by the grooves in the wheel spokes. The longitudinal grooves of the wheel spokes are intercepted by transverse grooves which permit the operator to readily grasp the handles 17 when they are folded inwardly, so that they may be thrown to their outward position where they are supported against moving downwardly by engaging the rim of the wheel, as clearly shown in Fig. 3. By means of these pivoted handles 17 the brakeman may secure a greater leverage in applying the brakes as they extend beyond the rim of the wheel, which is usually grasped at such times, and the form of the projecting handles is such that a better purchase may be had thereon than on the round rim of the wheel.

In order that the projecting handles 17 may not injure the brakeman when the brake is released by throwing the dog 13 out of engagement with the ratchet 12, a guard 18 is provided which is supported alongside of the brake wheel and is of an arc shape, both vertically and horizontally, with its ends beginning below the level of the extended handles and its middle portion extending considerably higher, so that the quick movement of the brake wheel, as when the brake is released, will cause the handles to ride up the inclined surface of the guard 18 with such force that they will be thrown over their pivotal connections to fall inwardly and thus be prevented from striking the brakeman. The effect of the guard 18 is to throw the handles 17 inwardly only when they are moving rapidly, permitting them to ride up and down over it without falling inwardly during the slower motion of the brake wheel, as when the brakes are being applied. Any suitable support may be given to the guard 18, as shown there being a bent metal rod 19 with cross arms 20 at its lower end secured to the car body and a clip 21 at its upper part surrounding the brake shaft 10. Obviously the rod 19, instead of having its crossed arms 20 secured to the end of the car body, may be bent so that said rod rests upon the roof of the car so as to be secured thereto.

From the foregoing it will be seen that by the present invention the brakeman is afforded a better hand-hold on the brake wheel with the advantage of a greater leverage for applying the brakes and the automatic retrieving means for the pivoted handles serve to withdraw them from the position where they might strike him and cause injury during the rapid rotation of the brake wheel when the brakes are released.

What I claim as my invention is;

1. A brake wheel having grooved spokes and a rim, and handles pivotally mounted in the grooves of the spokes and adapted to swing to a position where they extend beyond the rim to afford a convenient handhold and to swing to an inward position within the grooves.

2. A brake wheel having grooved spokes and a rim, and handles pivotally mounted in the grooves and adapted to swing to a position where they extend beyond the rim to afford a convenient hand-hold with their sides confined within the grooves and supported by bearing on the bottom of the grooves and also adapted to be swung inwardly within the grooves, there being transverse openings in the spokes to permit of access to the handles when swung inwardly.

3. A brake wheel, comprising a wheel member, pivoted handles mounted thereon adapted to swing outwardly beyond the rim of the wheel, and a guard located in the path of the handles for automatically returning them to their inner position when the brake is released.

4. A brake wheel, comprising a wheel member, handles pivoted thereto and extending beyond the rim thereof, a cam guard positioned in the path of the handles to return them to their inner position when the brake wheel moves quickly as on the release of the brakes, but permitting them to move thereon without being thrown inwardly when the brake wheel moves slowly as during the application of the brakes.

5. A brake wheel, comprising a brake shaft, a wheel member mounted thereon, handles pivotally mounted on the wheel member and projecting beyond the rim thereof, a rod having cross arms adapted to be secured to the car body, a clip on the rod engaging a brake shaft, and a curved arc shaped guard mounted on the rod in the path of the handles adapted to cause them to swing to their inward position when they are moved past it on releasing the brake.

In testimony whereof, I affix my signature, in presence of two witnesses.

DANIEL JOSEPH MONTAMBO.

Witnesses:
FRANK MURPHEY,
JOHN MORNINGSTON.